(No Model.)
J. F. JONES.
ALPHABETICAL TOY PUZZLE AND ADVERTISING DEVICE.
No. 390,784. Patented Oct. 9, 1888.
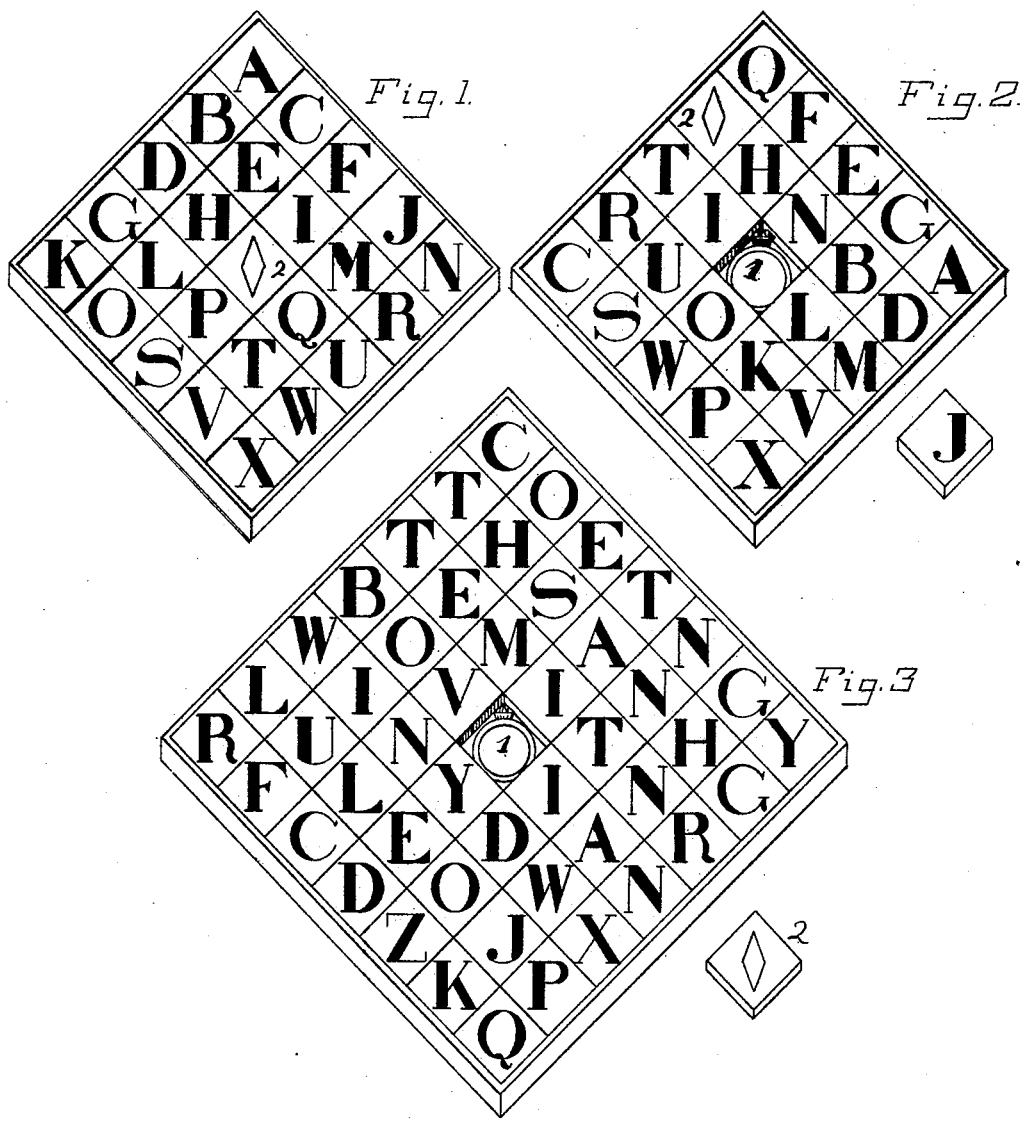

UNITED STATES PATENT OFFICE.

JAMES F. JONES, OF ELSINORE, CALIFORNIA.

ALPHABETICAL TOY PUZZLE AND ADVERTISING DEVICE.

SPECIFICATION forming part of Letters Patent No. 390,784, dated October 9, 1888.

Application filed June 26, 1888. Serial No. 278,244. (No model.)

*To all whom it may concern:*

Be it known that I, JAMES F. JONES, residing at Elsinore, in the county of San Diego and State of California, have invented a new and useful Alphabetical Toy Puzzle and Advertising Device, of which the following is a specification.

The object of my invention is to produce a toy puzzle instructing and entertaining, and which may be made to present such an appearance as to attract the attention and interest of those who see it, and thereby direct the attention to the article to be advertised.

My puzzle comprises a square box, an even number of square movable blocks arranged therein in rows of an odd number of blocks, each block being provided upon the upper face with a letter of the alphabet arranged diagonally across the face of the block, and an auxiliary block having a fanciful device—such as a diamond—upon its upper face.

The drawings illustrate my invention.

Figure 1 represents the simplest form of my puzzle, comprising a box arranged to contain twenty-five of the movable blocks. The face of one of the blocks is provided with a fanciful figure, which in this case is a diamond, and the faces of the other blocks are respectively provided with the several letters of the alphabet, excepting the last two letters, all being arranged diagonally across their respective blocks. Fig. 2 represents the puzzle in use as an advertising medium. Fig. 3 represents a modification of my puzzle, in which the box is adapted to contain forty-nine blocks, thereby allowing duplication of some of the letters of the alphabet.

The manner of using my invention as a puzzle is as follows: One of the blocks is removed, thus leaving a vacant space, as 1, the auxiliary block 2, which I call the "joker," being left in the box to serve as a repetend to express a repeated letter. The problem now to be solved is to slide the blocks around without removing them from the box until words or sentences are formed, the joker being used to represent any needed letter in any word formed. By arranging the letters diagonally across the face of the blocks, as shown, the letters are made to form rows of different lengths although the rows of blocks are equal in length, and when the letters are placed with their tops all in one direction they may be made to form words of different lengths, thereby facilitating the forming of words and sentences.

Figs. 2 and 3 illustrate the use of my invention as an advertising medium. The center block being removed and the article to be advertised being placed in the space thus left vacant, the blocks are so arranged as to form words which will direct attention to the object in the vacant space.

By arranging the box to contain rows of blocks having an odd number of blocks in each row a center space is provided for. If the number of blocks in each row were even, the middle diagonal row in which the joker is placed would have an even number of blocks in it, and therefore the article to be advertised could not be placed in the center of the device and the advertisement would not appear as symmetrical as I am able to make it by this arrangement.

Now, having described my invention, what I claim as new, and desire to secure by Letters Patent, is—

1. The puzzle and advertising device comprising a square box, an even number of square movable blocks arranged therein in equal rows of an odd number of blocks, each block being provided upon its upper face with a letter of the alphabet arranged diagonally across the face of the block, and an auxiliary block having a fanciful device upon its upper face.

2. The puzzle and advertising device comprising a square box arranged to contain twenty-five blocks, twenty-five movable blocks, the face of one of which is provided with a fanciful figure, and the faces of the other blocks are respectively provided with the several letters of the alphabet, excepting the last two letters, all being arranged diagonally across the face of their respective blocks.

JAMES F. JONES.

Witnesses:
JAMES R. TOWNSEND,
C. D. SHAW.